E. D. G. JONES.

Rag-Engine.

No. 8,609. Reissued Mar. 4, 1879.

WITNESSES:

Henry N. Miller

C. Sedgwick

INVENTOR:

E. D. G. Jones

BY Munn & Co

ATTORNEYS.

N. PETERS, PHOTO-LITHOGRAPHER, WASHINGTON, D. C.

UNITED STATES PATENT OFFICE.

EDWARD D. G. JONES, OF PITTSFIELD, MASSACHUSETTS.

IMPROVEMENT IN RAG-ENGINES.

Specification forming part of Letters Patent No. 194,824, dated September 4, 1877; Reissue No. 8,609, dated March 4, 1879; application filed February 6, 1879.

*To all whom it may concern:*

Be it known that I, EDWARD D. G. JONES, of Pittsfield, in the county of Berkshire and State of Massachusetts, have invented a new and Improved Rag-Engine, of which the following is a specification:

This invention has relation to engines which are designed for reducing rags to pulp fit for making paper.

The nature of my invention consists, first, in novel devices for lifting or adjusting long spindles or cutting-cylinders of rag-engines, where the bars are both arranged outside of the tub or vat, and supported independently thereof, the back bar being so placed, relatively to the tub, that the cutting-cylinder can be driven by a belt applied directly to a pulley on the spindle, the two bars being adjustable simultaneously from the front of the tub, as will be hereinafter explained; second, in a half-box bearing for the rear end of the cylinder-spindle, which is supported upon the rear bar, and adjustable at right angles to the longitudinal axis of the spindle, as will be hereinafter explained; third, in constructing the breast or back fall of the bed in a plane which is tangent to the arc of the concave beneath the cutting-cylinder, whereby a free discharge is effected, and the pulp is not thrown back over the cylinder, as will be hereinafter explained.

Other features of my invention will be hereinafter explained.

Figure 1:
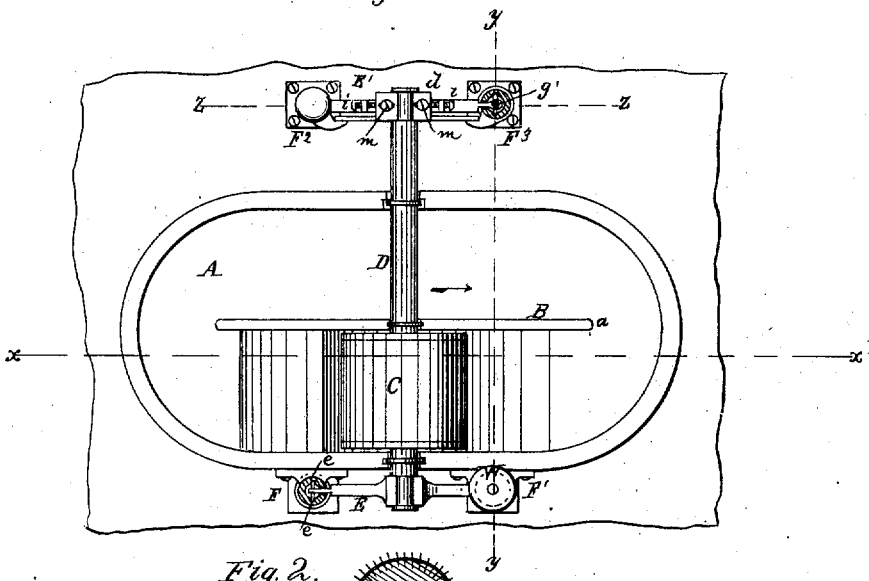
Figure 2:
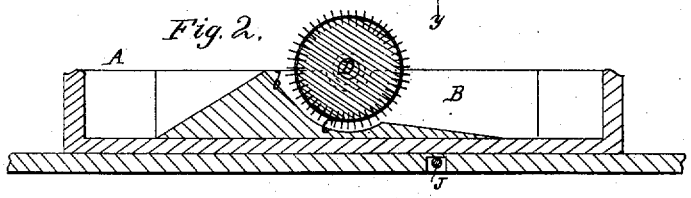
Figure 3:
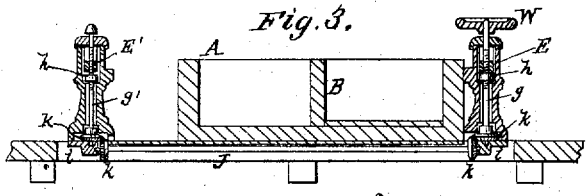
Figure 6:
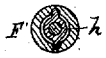
Figure 4:
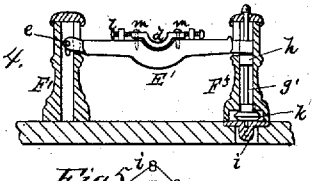
Figure 5:
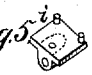

In the annexed drawings, Figure 1 is a plan view of my improved engine, showing horizontal sections through two of the pillars which bear the bars. Fig. 2 is a vertical longitudinal section taken in the plane indicated by dotted line *x x* on Fig. 1. Fig. 3 is a vertical transverse section taken in the plane indicated by dotted line *y y* on Fig. 1. Fig. 4 is a vertical section through dotted line *z z* on Fig. 1. Figs. 5 and 6 are details.

Similar letters of reference indicate corresponding parts.

The letter A designates the tub or vat, which is of the well-known oblong form, with semicircular ends, and constructed in the usual manner. The mid-fellow B in this tub is arranged so that the space between its end *a* and the end of the tub is somewhat contracted, as shown in Fig. 1, for the purpose of increasing the current at this point just before the material passes forward to the cutting-cylinder C.

The inclined bed of the tub is constructed in the usual manner, with this exception, the ascending breast or back fall *b* is a plane tangent to the arc of the concave *c*, and inclined at an angle varying from forty-five to seventy-five degrees. This allows the material free flow from the cylinder C over the ridge, and prevents the material from crowding back onto and over the cylinder.

Cylinder C is fast on a spindle, D, and this cylinder is armed with blades for reducing the rags to pulp against knives on the concave *c*, (not shown,) in the usual manner.

The front end of the spindle D has its bearing upon a bar, E, and the rear end of the spindle is supported in a half-box, *d*, on a bar, E′. Both bars E E′ are arranged outside of the tub, and sustained in pillars rising from the floor or harness on which the tub rests.

It is designed to apply a belt-pulley on the spindle D back of the tub, and for this reason the spindle is made quite long, and the bar E′ and its supports are located far enough from the tub to allow the application of the said pulley.

The two pillars F $F^1$ are rigidly bolted to the front side of the tub, and the two pillars $F^2$ $F^3$ are bolted to the floor or harness, and rigidly connected together.

Pillars F $F^2$ are tubular, and they are vertically slotted to receive the ends of the bars, which have pivots *e e* on them, that are received in grooves made in the bores of the pillars, as shown in the sectional views of the drawings. These two pillars F $F^2$ serve as the fulcra for the pivotal ends of the bars, and they are provided with removable caps for allowing these bars to be detached from them or replaced at pleasure.

The two pillars $F^1$ $F^3$ are constructed substantially like the pillars F $F^2$, and the ends of the bars E E′ are perforated to receive freely through them screw-rods *g g′*, which are tapped through nuts *h h*, on which said ends rest. These nuts are raised and lowered by turning the screw-rods to the right or left, carrying with them the bars, and adjusting the cylinder C toward or from the concave *c*, as may be required.

The lower ends of screw-rods *g g'* are stepped on blocks *i i* at the bases of the pillars $F^1$ $F^3$, and the upper ends of these screws pass through the caps on the pillars.

The front screw, *g*, has a hand-wheel, *w*, keyed on its upper end, by turning which the rear screw will receive the same movement of rotation through the medium of beveled wheels *k k k k* and a shaft, J, beneath the tub A.

This novel means for adjusting the cylinder to its work enables me to keep its knives exactly horizontal and parallel to the concave bed beneath it; consequently the beating or reduction of the rags will be uniform throughout the entire length of cylinder C, and especially when this cylinder is slightly raised from the bed-plate for the purpose of removing the knots in the pulp. A better result will thus be produced, and in a more expeditious manner than hitherto.

The horizontal adjustment of the cylinder C, and a perfect parallelism thereof with respect to the bed and breast or back fall, are obtained by means of the half bearing-box *d*, which is adjustable endwise by means of screws *l l*, tapped through lugs on the bar E'. This box *d* is held firmly to its bar by means of screws *m m*, which pass through oblong slots, as shown in Fig. 1.

I am aware that the back-falls of vats used in rag-engines have been curved back from the roll at the top, to enlarge the space at the delivery-point; but this construction but partially obviates the difficulties mentioned.

In my engine the bosom of the back-fall follows the curve of the roll to about the center of the bosom, and continues from that point to the top in a straight line or plane tangent to the arc of the concave, thereby furnishing a gradually-increasing space for the discharge of the pulp.

By this construction the back can be carried above the center of the roll, and the roll run at greater speed than heretofore, and still work well, furnishing an engine that will carry and turn more stock or pulp without settling than one of equal size without my improvement, and improving the quality of the pulp.

Having thus described my invention, I claim as new and desire to secure by Letters Patent—

1. Bars E E', supporting the ends of spindle D, and pivoted in pillars F $F^2$, in combination with the vertically-adjustable nuts *h* in pillars F $F^3$ and the two connected adjusting-screws *g g'*, so that both bars are adjusted simultaneously, substantially as and for the purpose described.

2. In a rag-engine, the two screw-rods *g g'*, gear-wheels *k*, and shaft J, combined with the bars E E', substantially as described.

3. In combination with the spindle of cylinder C and the rear adjustable bar, E', the bearing-box *d*, endwise adjustable, substantially as and for the purpose described.

4. In a rag-engine, the back-fall *b*, having its bosom from about the center to the upper edge formed in a straight line or in a plane tangent to the bottom concave portion, as and for the purposes set forth.

EDWARD D. G. JONES.

Witnesses:
F. A. CHURCHILL,
F. F. READ.